United States Patent [19]

Guell

[11] Patent Number: 5,572,765
[45] Date of Patent: Nov. 12, 1996

[54] HEATED WIPER BLADE AND BLADE CARRIER EMPLOYING SINGLE HEATING ELEMENT

[76] Inventor: Ronald R. Guell, P.O. Box 216, Eden, Wis. 53019

[21] Appl. No.: 617,677
[22] Filed: Feb. 2, 1996
[51] Int. Cl.⁶ .................................................. B60S 1/38
[52] U.S. Cl. .................. 15/250.06; 219/202; 15/250.48; 15/250.44
[58] Field of Search ........................... 15/250.06, 250.05, 15/250.07, 250.08, 250.09, 250.48, 250.44; 219/202, 203

[56] References Cited

U.S. PATENT DOCUMENTS

| | | | |
|---|---|---|---|
| 2,422,261 | 6/1947 | Ungerland | 15/250.06 |
| 2,677,143 | 5/1954 | Blaney | 15/250.06 |
| 2,746,077 | 5/1956 | Higgins | 15/250.07 |
| 2,865,040 | 12/1958 | Hamm | 15/250.06 |
| 3,419,932 | 1/1969 | Linker | 15/250.06 |
| 4,387,290 | 6/1983 | Yasuda | 15/250.07 |
| 4,928,345 | 5/1990 | Meltzer | 15/250.06 |
| 5,426,814 | 6/1995 | Minnick | 15/250.06 |
| 5,488,252 | 2/1996 | Randolph | 15/250.06 |
| 5,504,965 | 4/1996 | Givell | 15/250.06 |

FOREIGN PATENT DOCUMENTS

| | | | |
|---|---|---|---|
| 2585649 | 2/1987 | France | 15/250.05 |
| 2105774 | 9/1971 | Germany | 15/250.07 |

Primary Examiner—Gary K. Graham

[57] ABSTRACT

This invention relates to a new and useful improvement in a wiper blade and blade carrier which is electrically heated for use on the windshields of vehicles, such as automobiles, trucks, trains, boats, airplanes and the like so as to prevent the accumulation of ice, sleet or snow on the wiper blade and wiper blade carrier. More particularly, this invention has references to an improved heating arrangement designed to be used in windshield wiper assemblies with minimum modification or redesign of blade supporting, oscillating means, etc. A heating element of resistance wire is disposed the entire length of the passageway of the wiper blade and beyond into the blade carrier. The heating arrangement is connected to the vehicle battery to heat the heating element allowing the entire outer circumference of the entire wiper blade body and blade carrier to melt frozen precipitation on the wiper and blade carrier.

1 Claim, 2 Drawing Sheets

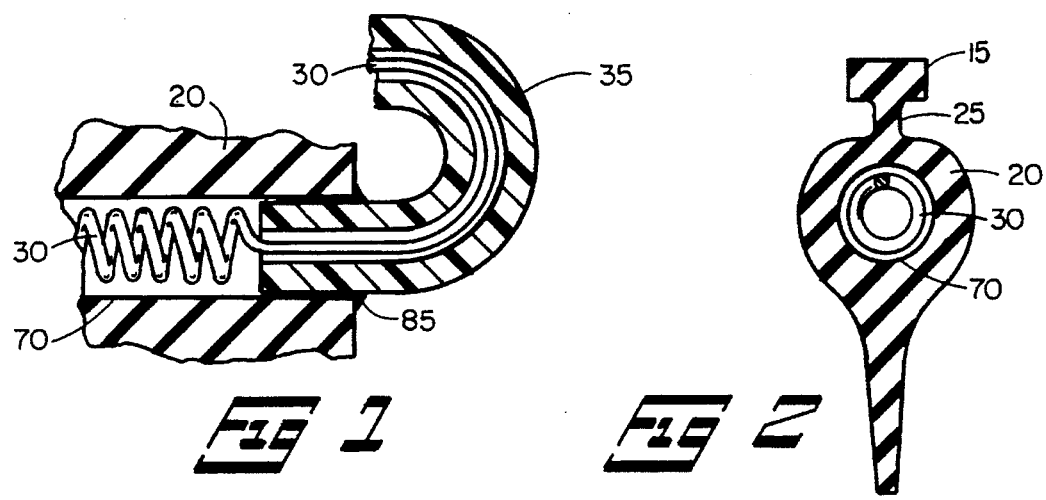
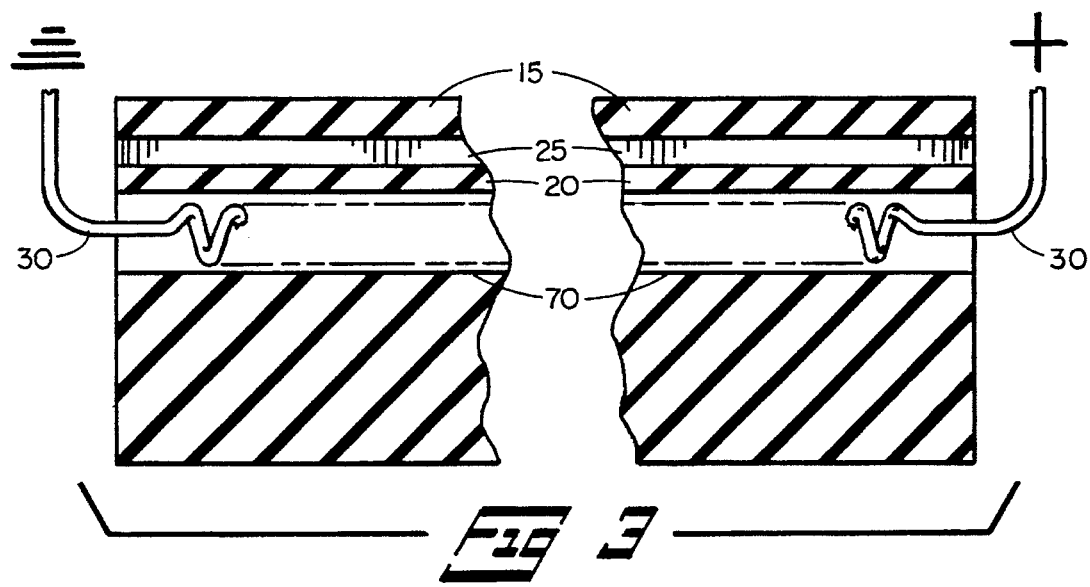
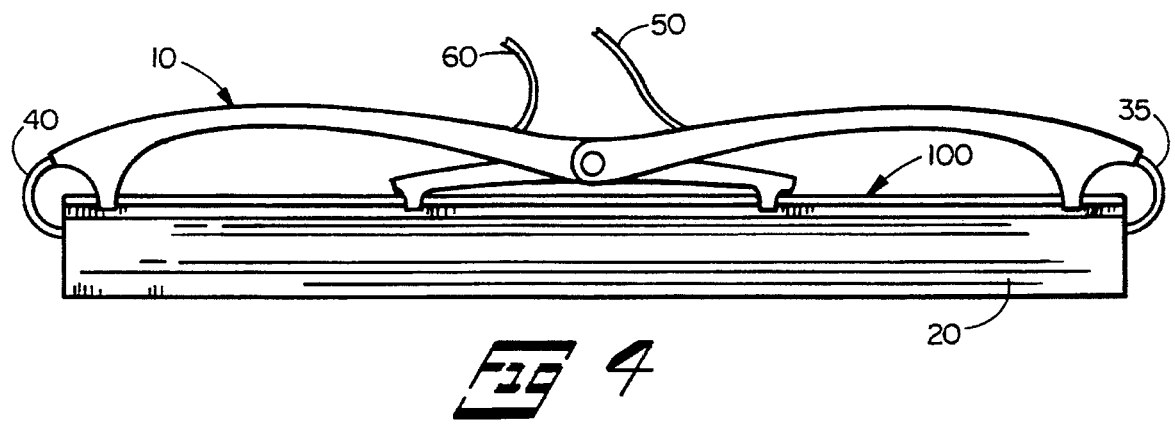

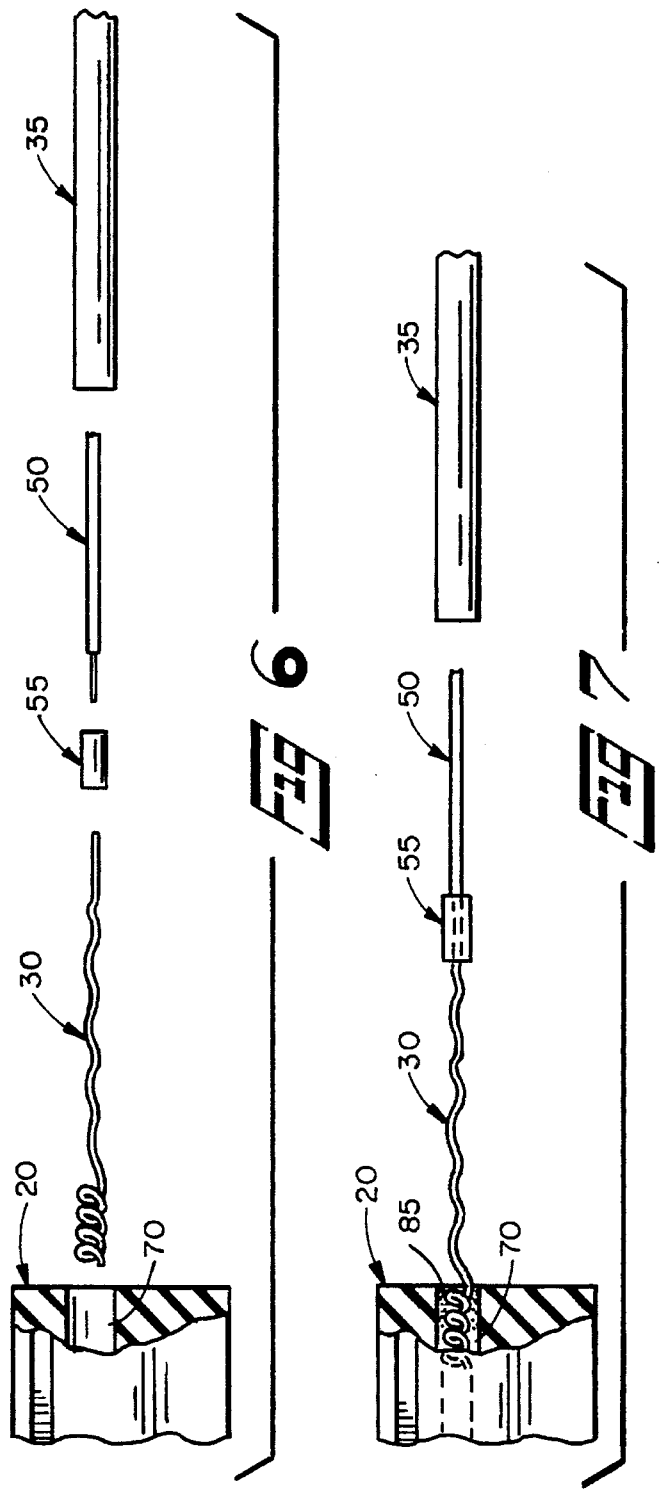

5,572,765

HEATED WIPER BLADE AND BLADE CARRIER EMPLOYING SINGLE HEATING ELEMENT

This application is related to U.S. applications Ser. No. 08/356,727, now U.S. Pat. No. 5,504,965, Ser. No. 08/516,353 and Ser. No. 08/569,455, now U.S. Pat. No. 5,539,951.

FIELD OF INVENTION

This invention relates generally to a heated wiper blade unit which incorporates a heating means for a wiper blade and wiper blade carrier; and is suitable for incorporating into a newly designed or current wiper blade art.

BACKGROUND OF INVENTION

When a vehicle is operated during blizzard, snow, sleet, or other inclement conditions, precipitation may not be cleared away because the wiper blade becomes lodged with ice and snow build-up, whereupon the blade pushes away from the windshield because of this build-up. The vehicle defroster is incapable of heating the windshield sufficiently to melt the frozen precipitation forming on the blade, blade carrier and associated mountings. When this icy build-up occurs the wiping performance is restricted ultimately severely reducing the vision of those in the vehicle, thereby creating driving hazards which in many instances have resulted in serious accidents.

It has been heretofore proposed that the wiper blade body and the blade carrier be heated so as to eliminate the hazards noted above. The main object of the present invention is to provide an improved heating means to a windshield wiper blade and the blade carrier that is particularly designed to be adapted for commercial large scale production. To this end, it is proposed to provide a blade and carrier heating arrangement which will make maximum use of the electrical energy required for heating. That is there will be a far more efficient heating means of the blade, carrier, and associated components in relation to the amount of electrical energy expended for heating the blade assembly than has been provided by previous devices conceived for the same purpose.

The wiper blade and carrier in which the heating arrangement is incorporated must be constructed of heat resistant material so that there is no deterioration of the materials in temperatures of up to 300 degrees Fahrenheit; incorporate an elongated passageway extending through the entire length of the blade; and also tubular superstructure wiper blade carrier.

The heating arrangement of this invention is inserted within the passageway of the wiper blade body and to and through the tubular superstructure of the blade carrier. A highly effective heated wiper blade and carrier can be created by utilizing applicant's heating element, associated components, and circuitry.

There have been a variety of attempt to improve the wiping action of a windshield wiper to clean the outer surface of a windshield in inclement weather.

U.S. Pat. No. 4,497,083 discloses a heated blade having a resistance wire running along the length of the wiper arm, the blade carrier and the wiper blade to heat the blade and carrier when it is connected to a vehicle's electrical system. The path through which the resistance wire travels and its various connections are quite complex in order to provide a blade which can be replaced independently of the arm and carrier.

U.S. Pat. No. 4,928,345 discloses a rather complex heated windshield wiper blade and holder utilizing more than one heating element. It appears to be quite weighty, thereby creating stress and excessive wear on the linkage and wiper motor.

U.S. Pat. No. 4,152,808 discloses a heating element of 0.125 inch wide and 0.005 inch thick embedded in the sides of a frame adapted to receive a wiper blade. In the upward direction heat is transferred to the frame, from the frame through a gap in the wiper body carrying the blade and finally down to the blade. In the outward lateral direction, heat is transferred to the surrounding air and essentially wasted. This indirect heating method is accordingly inefficient, and limits the flexibility of the blade, thereby inhibiting the blade wiping action.

None of these patents teach a heated wiper blade and carrier of simple, economical construction wherein the wiper blade and carrier can be both easily constructed and easily installed on an existing wiper arm.

Accordingly, it is an object of the present invention to provide a simple, low cost wiper blade and carrier heating arrangement which is capable of removing and/or preventing ice or snow build-up, road film and dirt on the wiper blade, carrier and associated assemblies. It is a further object of this invention to provide a flexible heating arrangement suitable for incorporation a into new or existing wiper blade, carrier, and associated assemblies; which is not fatigued by the repeated stresses of reciprocation; easy to replace and install; able to adapt to use on windshields having most any lateral or longitudinal curvature.

It is yet a further object of this invention to provide a wiper blade and carrier heating arrangement which permits the wiper blade to conform to the shape of the windshield under snow, sleet and all other conditions. Thus providing satisfactory wiping performance while simultaneously removing and keeping the wiper blade, carrier, linkage, and other associated components free from interference by ice, snow, road film and dirt.

Another object is to provide a wiper blade and carrier heating arrangement which allows for each 12 Volt blade to be calibrated so as to eliminate complexity, multiple connectors, timer, thermostat, and resistors by designing the heating wire to serve as the heating element and resistor.

It is to be understood that this invention is not limited in its application to the details of construction and to the following description or illustrations in the drawings. This invention is capable of other embodiments and of being practiced and carried out in various ways, also. It is to be understood that the phraseology and terminology employed herein are for the purpose of description and should not be regarded as limiting.

SUMMARY OF INVENTION

The principle object of the present invention is to provide a new heated windshield wiper assembly construction wherein the same can be utilized for clearing and removing ice formation on both the blade and the carrier. As such, the general purpose of the present invention, which will be described subsequently in greater detail, is to provide a unique apparatus which has many advantages of the wipers mentioned heretofore and many novel features that result in a heated windshield wiper/carrier which is not anticipated, rendered obvious, suggested or even implied by any of the prior art wipers, either alone or in any combination thereof.

To attain this, the present invention comprises a wiper blade formed of heat resistant material, which includes a hollow horizontal passageway extending the entire length of the wiper blade. A heating element of any appropriate configuration, such as a helical or corrugate, is positioned through the entire length of the passageway of the wiper blade body and continues beyond the passageway first and second ends, into first and second end insulator sleeves and into the first and second openings of the tubular superstructure of the wiper blade carrier and extend a predetermined length inside the wiper blade carrier. The heating element from the first and second ends of the passageway to the inside area of the tubular superstructure of the wiper blade carrier may be of any appropriate configuration, such as coiled or straight or a combination thereof. A protective flexible, air tight, moisture and heat resistant end insulator sleeve, or the like, containing the extended heating element and is inserted into or onto first and second passageway ends and sealed with a moisture impervious material. Said extended heating element first end continues upward within the tubular carrier where it is joined with the second end of the live lead hot wire such as insulated stranded copper wire, using any know method, such as, crimp connection, solder, or the like. The ground wire first end is connected to the second end of heating element end and likewise joined.

Electric power is supplied to the heating element utilizing the vehicles existing power supply in any currently known manner using a 12 Volt system without the necessity of additional resistors. The circuitry, basically an electrical source with a fuse is connected to the heating element. The heating element also connects to a ground source. Simply stated current passes through the heating element and the heat is conducted into the body of the blade, end insulator sleeves and carrier, thus heating the entire surface of the blade body, carrier and surrounding end area.

Field testing of this invention has proven successful in providing satisfactory wiping performance while simultaneously removing and keeping the windshield, blade body, carrier and associated components free from interference by ice, sleet, road film and dirt with no apparent deterioration of the blade, wiping performance, heating element or other embodiments.

The present invention may be easily and efficiently manufactured utilizing existing-styled or newly created blade assemblies, including but not limited to wiper blade, frame, carrier etc.

BRIEF DESCRIPTION OF THE DRAWINGS

This invention will be better understood and objects other than those set forth above will become apparent when consideration is given to the following detailed description thereof. Such description makes reference to the annexed drawings wherein:

FIG. 1 is an enlarged sectional end view of the wiper blade passageway with its contents.

FIG. 2 is an enlarged cross sectional view of the wiper blade illustrating the heating element within the passageway.

FIG. 3 is an enlarged longitudinal sectional view of the wiper blade illustrating the heating element within the passageway and extending outwardly.

FIG. 4 is a longitudinal view of the wiper blade assembly.

FIG. 5 is a longitudinal view of wiper blade assembly exposing the heating means.

FIG. 6 is a copy of components used in the creation of the heating arrangement.

FIG. 7 is a copy of partially assembled components used in the creation of the heating arrangement.

DETAILED DESCRIPTION OF THE DRAWINGS

Referring now more specifically to the drawings, FIG. 5 shows a wiper blade body 20 inserted through wiper blade vertebrate 100. Vertebrate 100 slides under wiper blade carrier clips 105 and connects to tubular superstructure wiper blade carrier 10. Current in a live lead wire 50 first end leading from the vehicle electrical source of power, the battery (not shown) via ignition on-off switch (not shown) entering the hollow interior tube of carrier 10 where therein enters first end of first insulator sleeve and connects to the first end of heating element 30 at first connection 55. Element 30 first end from connector 55 passes through carrier 10 within the first end insulator sleeve 35 and enters first end of passageway 70 of body 20 where therein or upon exits second end of first end insulator sleeve 35. Current continues in element 30 through entire length of passageway 70 entering first end of second end insulator sleeve 40 inside of or at second end of passageway 70 of body 20 exiting second end of passageway 70 and continues within second sleeve 40 entering the second hollow interior tube of carrier 10 and connects to first end of ground wire 60 at connection 65 within second end insulator sleeve within carrier 10. First end of ground wire 60 exits second end of second end insulator sleeve 40, exiting second end of hollow interior tube of carrier 10. Wire 60 second end terminates at ground point.

FIGS. 1, 2, 3, 5 illustrates the position of element 30 with its ability to flex freely within the dead air space provided by passageway 70. Gauge and length of resistance wire of element 30 must first be calculated to heat sufficiently all necessary parts of the wiper blade assembly including the desired heated portions of carrier 10, first sleeve 35, second sleeve 40 and wiper blade body 20. Element 30 is designed to regulate its heating capabilities by use of designed resistance wire length and/or diameter. Additionally a variation of constructed resistance wire design utilizing either coiled, straight or a combination thereof allows precise heating of blade assembly. With this method of regulating, an ideal amount of heat tier body 20, first sleeve 35, second sleeve 40 and carrier 10 for any length wiper blade may be easily calibrated. The entombed area within the heated dead air space provides maximum heating efficiency.

FIG. 6 shows a layout with actual size of components which may be used to produce sufficient heat for the intended stated purpose. In reference to first end of passageway 70, FIG. 7 shows a partial assembly of the components illustrated in FIG. 6 with the coils of element 30 being first inserted into passageway 70 with stretch coils or straight wire remaining outside passageway 70. Wire 50 second end is joined to first end of element 30 at first connection 55. The first sleeve 35 is then slid over this sub-assembly, inserted into passageway 70 first end with said sleeve second exterior end either sealed within or upon the face end of passageway 70 or a combination thereof, at second seal first end insulator sleeve 85, of wiper blade body 20 with a heat resistant material, such as DAP, preventing lateral end sleeve movement while simultaneously allowing heating element to flex within.

At the second end of wiper blade body 20 with identical component parts the same procedure is likewise performed. Wire 60 first end is joined to second end of element 30 at second connection 65. The second end sleeve 40 is then slid over this sub-assembly, inserted into passageway second end with said sleeve first exterior end and either sealed within or upon the face end of passageway 70 or a combination thereof, at first seal second end insulator sleeve 90, of wiper blade body 20 with a heat resistant material, such as DAP, preventing lateral end sleeve movement while simultaneously allowing heating element to flex within.

First sleeve 35 at first end is sealed or bonded to insulation of live lead wire 50 inside tube of carrier 10 at first seal first end insulator sleeve 80. Second sleeve 40 at second end is sealed or bonded to insulation of ground wire 60 inside tube of carrier 10 at second seal second end insulator seal 95.

FIG. 2 is a cross section of body 20 showing the position of the element 30 with its interior in relation to the side wall of passageway 70. FIG. 2 and FIG. 3 show wiper blade head 15 used for insertion into wiper blade vertebrate 100 of carrier 10. Wiper blade hinge 25 connects head 15 to body 20 allowing body 20 to oscillate. FIG. 4 shows the complete invention as viewed exemplifying streamlined characteristics.

I claim:

1. A heated wiper blade assembly adapted to be mounted to a wiper arm of a motor vehicle and adapted to be connected to a vehicle electrical system, said assembly comprising:

an elongated, tubular blade carrier which defines first and second hollow ends, said carrier includes clips thereon;

an elongated, wiper blade, said wiper blade comprised of an elongated, flexible blade body having first and second ends, a wiper blade head and a wiper blade hinge connecting said body and head, said elongated body including a passageway extending entirely therethrough between the first and second ends thereof, said wiper blade head is coupled with and supported by said clips;

a first elongated, insulative sleeve has a first end received into the passageway at the first end of the body and a second end received into the first hollow end of the carrier;

a second elongated, insulative sleeve has a first end received into the passageway at the second end of the body and a second end received into the second hollow end of the carrier;

an elongated, one piece heating element of resistance wire having first and second ends and being of helical form intermediate said ends, said heating element is loosely received in the passageway of said body with said first end thereof extending through the first insulative sleeve into the first end of the carrier and with said second end thereof extending through the second insulative sleeve into the second end of the carrier wherein said heating element heats both the blade body and the elongated carrier, said first end of said heating element is connected with a first lead wire within said first insulative sleeve within said first end of said carrier and said second end of said heating element is connected with a second lead wire within said second insulative sleeve within said second end of said carrier.

* * * * *